United States Patent
Alamouti et al.

(10) Patent No.: US 6,185,258 B1
(45) Date of Patent: Feb. 6, 2001

(54) TRANSMITTER DIVERSITY TECHNIQUE FOR WIRELESS COMMUNICATIONS

(75) Inventors: Siavash Alamouti, Kirkland, WA (US); Vahid Tarokh, Madison, NJ (US)

(73) Assignee: AT&T Wireless Services Inc., Redmond, WA (US)

( * ) Notice: Under 35 U.S.C. 154(b), the term of this patent shall be extended for 0 days.

(21) Appl. No.: 09/074,224

(22) Filed: May 7, 1998

Related U.S. Application Data

(60) Provisional application No. 60/059,016, filed on Sep. 16, 1997, provisional application No. 60/059,219, filed on Sep. 18, 1997, and provisional application No. 60/063,780, filed on Oct. 31, 1997.

(51) Int. Cl.[7] .............................. H04K 1/10; H04L 27/28
(52) U.S. Cl. ......................... 375/260; 375/347; 371/43.7
(58) Field of Search .................................. 375/267, 295, 375/299, 262, 340, 341, 346, 347, 260; 455/132; 371/43.6, 43.7, 43.8, 37.11

(56) References Cited

U.S. PATENT DOCUMENTS

| | | | |
|---|---|---|---|
| 3,978,408 | * 8/1976 | Gupta et al. | 375/347 |
| 4,001,692 | 1/1977 | Fenwick . | |
| 4,099,121 | * 7/1978 | Fang | 375/347 |
| 4,369,516 | 1/1983 | Byrns . | |
| 4,567,464 | * 1/1986 | Siegel et al. | 340/347 |
| 4,763,331 | * 8/1988 | Matsumoto | 375/262 |
| 5,029,185 | * 7/1991 | Wei | 375/261 |
| 5,088,113 | * 2/1992 | Wei | 375/347 |
| 5,101,501 | * 3/1992 | Gilhousen et al. | 455/33 |
| 5,109,390 | * 4/1992 | Gilhousen et al. | 375/200 |
| 5,283,870 | * 2/1994 | Schuchman et al. | 370/50 |
| 5,319,667 | * 6/1994 | Kim | 375/347 |
| 5,416,797 | * 5/1995 | Gilhousen et al. | 375/205 |
| 5,442,627 | * 8/1995 | Viterbi et al. | 370/22 |
| 5,457,712 | * 10/1995 | Weerackody | 375/347 |
| 5,461,646 | 10/1995 | Anvari . | |
| 5,499,272 | 3/1996 | Bottomley . | |
| 5,848,103 | * 12/1998 | Weerackody | 375/295 |

FOREIGN PATENT DOCUMENTS 0 767 546 A2    9/1997  (EP) .

* cited by examiner

Primary Examiner—Chi H. Pham
Assistant Examiner—Bryan Webster

(57) ABSTRACT

A simple block coding arrangement is created with symbols transmitted over a plurality of transmit channels, in connection with coding that comprises only of simple arithmetic operations, such as negation and conjugation. The diversity created by the transmitter utilizes space diversity and either time or frequency diversity. Space diversity is effected by redundantly transmitting over a plurality of antennas, time diversity is effected by redundantly transmitting at different times, and frequency diversity is effected by redundantly transmitting at different frequencies. Illustratively, using two transmit antennas and a single receive antenna, one of the disclosed embodiments provides the same diversity gain as the maximal-ratio receiver combining (MRRC) scheme with one transmit antenna and two receive antennas. The principles of this invention are applicable to arrangements with more than two antennas, and an illustrative embodiment is disclosed using the same space block code with two transmit and two receive antennas.

30 Claims, 2 Drawing Sheets

TRANSMITTER DIVERSITY TECHNIQUE FOR WIRELESS COMMUNICATIONS

This application claims the benefit of U.S. provisional application Ser. No. 60/059016, filed Sep. 16, 1997; of U.S. provisional application Ser. No. 60/059219, filed Sep. 18, 1997; and of U.S. provisional application Ser. No. 60/063780, filed Oct. 31, 1997.

BACKGROUND OF THE INVENTION

This invention relates to wireless communication and, more particularly, to techniques for effective wireless communication in the presence of fading and other degradations.

The most effective technique for mitigating multipath fading in a wireless radio channel is to cancel the effect of fading at the transmitter by controlling the transmitter's power. That is, if the channel conditions are known at the transmitter (on one side of the link), then the transmitter can pre-distort the signal to overcome the effect of the channel at the receiver (on the other side). However, there are two fundamental problems with this approach. The first problem is the transmitter's dynamic range. For the transmitter to overcome an x dB fade, it must increase its power by x dB which, in most cases, is not practical because of radiation power limitations, and the size and cost of amplifiers. The second problem is that the transmitter does not have any knowledge of the channel as seen by the receiver (except for time division duplex systems, where the transmitter receives power from a known other transmitter over the same channel). Therefore, if one wants to control a transmitter based on channel characteristics, channel information has to be sent from the receiver to the transmitter, which results in throughput degradation and added complexity to both the transmitter and the receiver.

Other effective techniques are time and frequency diversity. Using time interleaving together with coding can provide diversity improvement The same holds for frequency hopping and spread spectrum. However, time interleaving results in unnecessarily large delays when the channel is slowly varying. Equivalently, frequency diversity techniques are ineffective when the coherence bandwidth of the channel is large (small delay spread).

It is well known that in most scattering environments antenna diversity is the most practical and effective technique for reducing the effect of multipath fading. The classical approach to antenna diversity is to use multiple antennas at the receiver and perform combining (or selection) to improve the quality of the received signal.

The major problem with using the receiver diversity approach in current wireless communication systems, such as IS-136 and GSM, is the cost, size and power consumption constraints of the receivers. For obvious reasons, small size, weight and cost are paramount. The addition of multiple antennas and RF chains (or selection and switching circuits) in receivers is presently not be feasible. As a result, diversity techniques have often been applied only to improve the up-link (receiver to base) transmission quality with multiple antennas (and receivers) at the base station. Since a base station often serves thousands of receivers, it is more economical to add equipment to base stations rather than the receivers Recently, some interesting approaches for transmitter diversity have been suggested. A delay diversity scheme was proposed by A. Wittneben in "Base Station Modulation Diversity for Digital SIMULCAST," Proceeding of the 1991 IEEE Vehicular Technology Conference (VTC 41 st), PP. 848–853, May 1991, and in "A New Bandwidth Efficient Transmit Antenna Modulation Diversity Scheme For Linear Digital Modulation," in Proceeding of the 1993 IEEE International Conference on Communications (IICC '93), PP. 1630–1634, May 1993. The proposal is for a base station to transmit a sequence of symbols through one antenna, and the same sequence of symbols—but delayed—through another antenna.

U.S. Pat. No. 5,479,448, issued to Nambirajan Seshadri on Dec. 26, 1995, discloses a similar arrangement where a sequence of codes is transmitted through two antennas. The sequence of codes is routed through a cycling switch that directs each code to the various antennas, in succession. Since copies of the same symbol are transmitted through multiple antennas at different times, both space and time diversity are achieved. A maximum likelihood sequence estimator (MLSE) or a minimum mean squared error (MMSE) equalizer is then used to resolve multipath distortion and provide diversity gain. See also N. Seshadri, J. H. Winters, "Two Signaling Schemes for Improving the Error Performance of FDD Transmission Systems Using Transmitter Antenna Diversity," Proceeding of the 1993 IEEE Vehicular Technology Conference (VTC 43rd), pp. 508–511, May 1993; and J. H. Winters, "The Diversity Gain of Transmit Diversity in Wireless Systems with Rayleigh Fading," Proceeding of the 1994 ICC/SUPERCOMM, New Orleans, Vol. 2, PP. 1121–1125, May 1994.

Still another interesting approach is disclosed by Tarokh, Seshadri, Calderbank and Naguib in U.S. application, Ser. No. 08/847635, filed Apr. 25, 1997 (based on a provisional application filed Nov. 7, 1996), where symbols are encoded according to the antennas through which they are simultaneously transmitted, and are decoded using a maximum likelihood decoder. More specifically, the process at the transmitter handles the information in blocks of M1 bits, where M1 is a multiple of M2, i.e., M1=k*M2. It converts each successive group of M2 bits into information symbols (generating thereby k information symbols), encodes each sequence of k information symbols into n channel codes (developing thereby a group of n channel codes for each sequence of k information symbols), and applies each code of a group of codes to a different antenna

SUMMARY

The problems of prior art systems are overcome, and an advance in the art is realized with a simple block coding arrangement where symbols are transmitted over a plurality of transmit channels and the coding comprises only of simple arithmetic operations, such as negation and conjugation. The diversity created by the transmitter utilizes space diversity and either time diversity or frequency diversity. Space diversity is effected by redundantly transmitting over a plurality of antennas; time diversity is effected by redundantly transmitting at different times; and frequency diversity is effected by redundantly transmitting at different frequencies. Illustratively, using two transmit antennas and a single receive antenna, one of the disclosed embodiments provides the same diversity gain as the maximal-ratio receiver combining (MRRC) scheme with one transmit antenna and two receive antennas. The novel approach does not require any bandwidth expansion or feedback from the receiver to the transmitter, and has the same decoding complexity as the MRRC. The diversity improvement is equal to applying maximal-ratio receiver combining (MRRC) at the receiver with the same number of antennas. The principles of this invention are applicable to arrangements with more than two antennas, and an illustrative embodiment is disclosed using the same space lock code with two transmit and two receive antennas. This scheme provides the same diversity gain as four-branch MRRC.

DETAIL DESCRIPTION

In accordance with the principles of this invention, effective communication is achieved with encoding of symbols that comprises merely negations and conjugations of symbols (which really is merely negation of the imaginary part) in combination with a transmitter created diversity. Space diversity and either frequency diversity or time diversity are employed.

Figure 1:
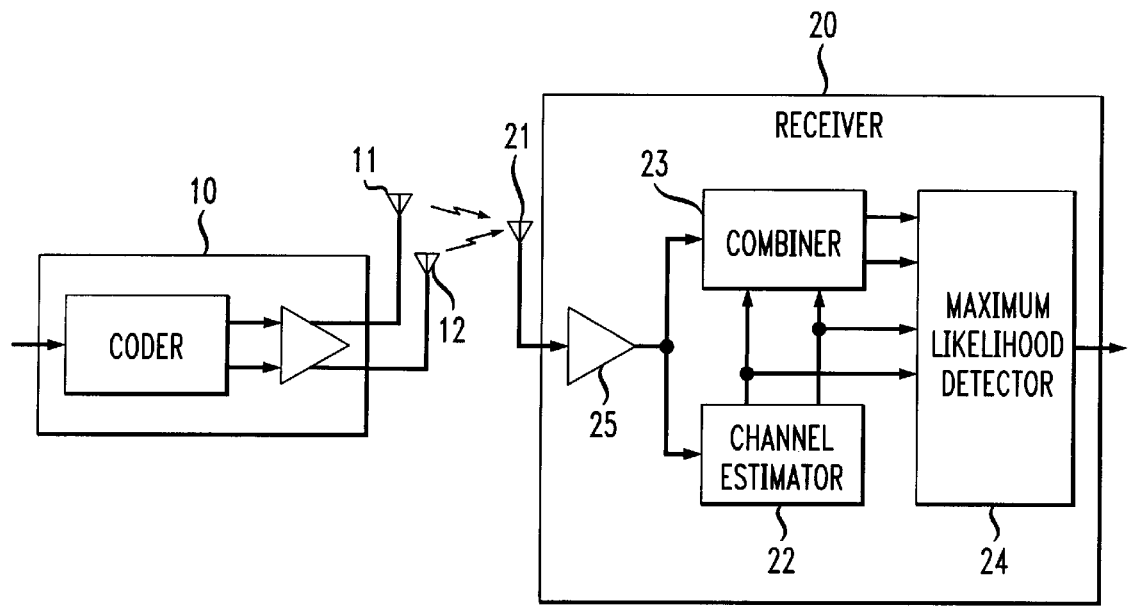
FIG. 1 is a block diagram of a first embodiment in accordance with the principles of this invention.

FIG. 1 presents a block diagram of an arrangement where the two controllable aspects of the transmitter that are used are space and time. That is, the FIG. 1 arrangement includes multiple transmitter antennas (providing space diversity) and employs multiple time intervals. Specifically, transmitter 10 illustratively comprises antennas 11 and 12, and it handles incoming data in blocks n symbols, where n is the number of transmitter antennas, and in the illustrative embodiment of FIG. 1, it equals 2, and each block takes n symbol intervals to transmit. Also illustratively, the FIG. 1 arrangement includes a receiver 20 that comprises a single antenna 21.

At any given time, a signal sent by a transmitter antenna experiences interference effects of the traversed channel, which consists of the transmit chain, the air-link, and the receive chain. The channel may be modeled by a complex multiplicative distortion factor composed of a magnitude response and a phase response. In the exposition that follows therefore, the channel transfer function from transmit antenna 11 to receive antenna 21 is denoted by $h_0$ and from transmit antenna 12 to receive antenna 21 is denoted by $h_1$, where:

$$h_0 = a_0 e^{j\Theta_0},$$
$$h_1 = a_1 e^{j\Theta_1}, \quad (1)$$

Noise from interference and other sources is added at the two received signals and, therefore, the resulting baseband signal received at any time and outputted by reception and amplification section 25 is $$r(t) = a_0 e^{j\Theta} s_i + n(t), \quad (2)$$

where $s_i$ and $s_j$ are the signals being sent by transmit antenna 11 and 12, respectively.

As indicated above, in the two-antenna embodiment of FIG. 1 each block comprises two symbols and it takes two symbol intervals to transmit those two symbols. More specifically, when symbols $s_i$ and $s_j$ need to be transmitted, at a first time interval the transmitter applies signal $s_i$ to antenna 11 and signal $s_j$ to antenna 12, and at the next time interval the transmitter applies signal $-s_1^*$ to antenna 11 and signal $s_0^*$ to antenna 12. This is clearly a very simple encoding process where only negations and conjugations are employed. As demonstrated below, it is as effective as it is simple. Corresponding to the above-described transmissions, in the first time interval the received signal is $$r(t) = h_0 s_i + h_1 s_j + n(t), \quad (3)$$

and in the next time interval the received signal is $$r(t+T) = -h_0 s_j^* + h_1 s_i^* + n(t+T). \quad (4)$$

Table 1 illustrates the transmission pattern over the two antennas of the FIG. 1 arrangement for a sequence of signals $\{s_0, s_1, s_2, s_3, s_4, s_5, \ldots\}$.

TABLE 1

| Time: | t | t + T | t + 2T | t + 3T | t + 4T | t + 5T | |
|---|---|---|---|---|---|---|---|
| Antenna 11 | $s_0$ | $-s_1^*$ | $s_2$ | $-s_3^*$ | $s_4$ | $-s_5^*$ | ... |
| Antenna 12 | $s_1$ | $s_0^*$ | $s_3$ | $s_2^*$ | $s_5$ | $s_4^*$ | ... |

The received signal is applied to channel estimator 22, which provides signals representing the channel characteristics or, rather, the best estimates thereof. Those signals are applied to combiner 23 and to maximum likelihood detector 24. The estimates developed by channel estimator 22 can be obtained by sending a known training signal that channel estimator 22 recovers, and based on the recovered signal the channel estimates are computed. This is a well known approach.

Combiner 23 receives the signal in the first time interval, buffers it, receives the signal in the next time interval, and combines the two received signals to develop signals $$\tilde{s}_i = \tilde{h}_0^* r(t) + \tilde{h}_1 r^*(t+T)$$
$$\tilde{s}_j = \tilde{h}_1^* r(t) - \tilde{h}_0 r^*(t+T) \quad (5)$$

Substituting equation (1) into (5) yields $$\tilde{s}_i = (\tilde{a}_0^2 + \tilde{a}_1^2) s_i + \tilde{h}_0^* n(t) + \tilde{h}_1 n^*(t+T)$$
$$\tilde{s}_j = (\tilde{a}_0^2 + \tilde{a}_1^2) s_j - \tilde{h}_0 n^*(t+T) + \tilde{h}_1^* n(t), \quad (6)$$

where $\tilde{a}_0^2 = \tilde{h}_0 \tilde{h}_0^*$ and $\tilde{a}_1^2 = \tilde{h}_1 \tilde{h}_1^*$, demonstrating that the signals of equation (6) are, indeed, estimates of the transmitted signals (within a multiplicative factor). Accordingly, the signals of equation (6) are sent to maximum likelihood detector 24.

In attempting to recover $s_i$, two kind of signals are considered: the signals actually received at time t and t+T, and the signals that should have been received if $s_i$ were the signal that was sent. As demonstrated below, no assumption is made regarding the value of $s_j$. That is, a decision is made that $s_i = s_x$ for that value of x for which $$d^2[r(t),(h_0 s_x + h_1 s_j)] + d^2[r(t+T),(-h_1 s_j^* + h_0 s_x^*)]$$

is less than $$d^2[r(t),(h_0 s_k + h_1 s_j)] + d^2[r(t+T),(-h_1 s_j^* + h_0 s_k^*)], \quad (7)$$

where $d^2(x,y)$ is the squared Euclidean distance between signals x and y, i.e., $$d^2(x,y)=|x-y|^2.$$

Recognizing that $\tilde{h}_0 = h_0 + $ noise that is independent of the transmitted symbol, and that $\tilde{h}_1 = h_1 + $ noise that is independent of the transmitted symbol, equation (7) can be rewritten to yield $$(a_0^2+a_1^2)|s_x|^2 - \tilde{s}_i s_x^* - \tilde{s}_i^* s_x \leq (a_0^2+a_1^2)|s_k|^2 - \tilde{s}_i s_k^* - \tilde{s}_i^* s_k \quad (8)$$

where $a_0^2 = h_0 h_0^*$ and $a_1^2 = h_1 h_1^*$; or equivalently, $$(a_0^2+a_1^2-1)|s_x|^2 + d^2(\tilde{s}_i, s_x) \leq (a_0^2+a_1^2-1)|s_k|^2 d^2(\tilde{s}_i, s_k). \quad (9)$$

In Phase Shift Keying modulation, all symbols carry the same energy, which means that $|s_x|^2 = |s_k|^2$ and, therefore, the decision rule of equation (9) may be simplified to choose signal $$\hat{s}_i s_x \text{ iff } d^2(\tilde{s}_i, s_x) \leq d^2(\tilde{s}_i, s_k). \quad (10)$$

Thus, maximum likelihood detector 24 develops the signals $s_k$ for all values of k, with the aid of $\tilde{h}_0$ and $\tilde{h}_1$ from estimator 22, develops the distances $d^2(\tilde{s}_i, s_k)$, identifies x for which equation (10) holds and concludes that $\hat{s}_i = s_x$. A similar process is applied for recovering $\hat{s}_j$.

Figure 2:
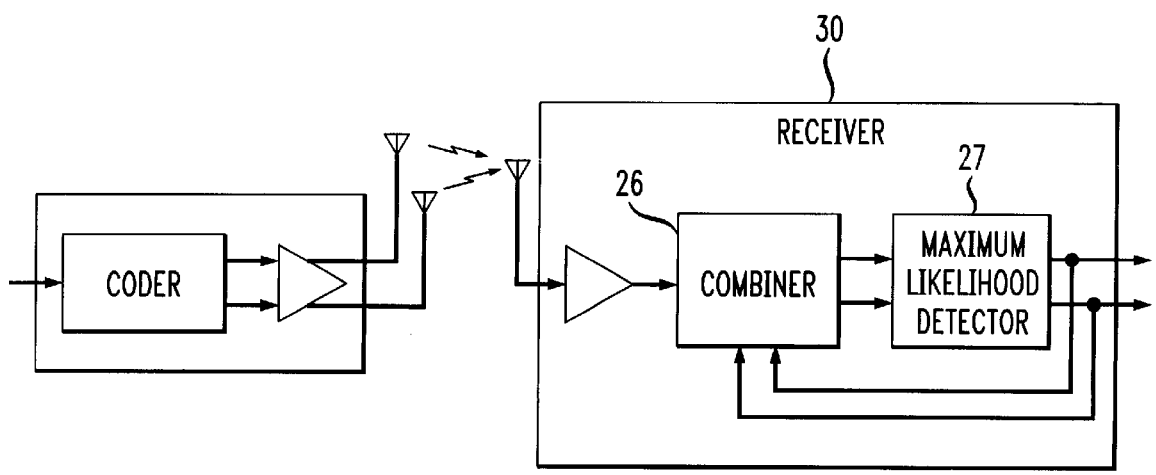
FIG. 2 presents a block diagram of a second embodiment, where channel estimates are not employed.

In the above-described embodiment each block of symbols is recovered as a block with the aid of channel estimates $\tilde{h}_0$ and $\tilde{h}_1$. However, other approaches to recovering the transmitted signals can also be employed. Indeed, an embodiment for recovering the transmitted symbols exists where the channel transfer functions need not be estimated at all, provided an initial pair of transmitted signals is known to the receiver (for example, when the initial pair of transmitted signals is prearranged). Such an embodiment is shown in FIG. 2, where maximum likelihood detector 27 is responsive solely to combiner 26. (Elements in FIG. 3 that are referenced by numbers that are the same as reference numbers in FIG. 1 are like elements.) Combiner 26 of receiver 30 develops the signals $$r_0 = r(t) = h_0 s_0 + h_1 s_1 + n_0$$
$$r_1 = r(t+T) = h_1 s_0^* - h_0 s_1^* + n_1$$
$$r_2 = r(t+2T) = h_0 s_2 + h_1 s_3 + n_2$$
$$r_3 = r(t+3T) = h_1 s_2^* - h_0 s_3^* + n_3, \quad (11)$$

then develops intermediate signals A and B $$A = r_0 r_3^* - r_2 r_1^*$$
$$B = r_2 r_0^* + r_1 r_3^* \quad (12)$$

and finally develops signals $$\tilde{s}_2 = A s_1^* + B s_0$$
$$\tilde{s}_3 = -A s_0^* + B s_1, \quad (13)$$

where $N_3$ and $N_4$ are noise terms. It may be noted that signal $r_2$ is actually $r_2 = h_0 \tilde{s}_2 + h_1 \tilde{s}_3 = h_0 s_2 + h_1 s_3 + n_2$, and similarly for signal $r_3$. Since the makeup of signals A and B makes them also equal to $$A = (a_0^2+a_1^2)(s_2 s_1 - s_3 s_0) + N_1$$
$$B = (a_0^2+a_1^2)(s_2 s_0^* + s_3 s_1^*) + N_2, \quad (14)$$

where N1 and N2 are noise terms, it follows that signals $\tilde{s}_2$ and $\tilde{s}_3$ are equal to $$\tilde{s}_2 = (a_0^2+a_1^2)(|s_0|^2+|s_1|^2)s_2 + N_3$$
$$\tilde{s}_3 = (a_0^2+a_1^2)(|s_0|^2+|s_1|^2)s_3 + N_4. \quad (15)$$

When the power of all signals is constant (and normalized to 1) equation (15) reduces to $$\tilde{s}_2 = (a_0^2+a_1^2)s_2 + N_3$$
$$\tilde{s}_3 = (a_0^2+a_1^2)s_3 + N_4. \quad (16)$$

Hence, signals $\tilde{s}_2$ and $\tilde{s}_3$ are, indeed, estimates of the signals $s_2$ and $s_3$ (within a multiplicative factor). Lines 28 and 29 demonstrate the recursive aspect of equation (13), where signal estimates $\tilde{s}_2$ and $\tilde{s}_3$ are evaluated with the aid of recovered signals $s_0$ and $s_1$ that are fed back from the output of the maximum likelihood detector.

Signals $\tilde{s}_2$ and $\tilde{s}_3$ are applied to maximum likelihood detector 24 where recovery is effected with the metric expressed by equation (10) above. As shown in FIG. 2, once signals $s_2$ and $s_3$ are recovered, they are used together with received signals $r_2, r_3, r_4$, and $r_5$, to recover signals $s_4$ and $s_5$, and the process repeats.

Figure 3:
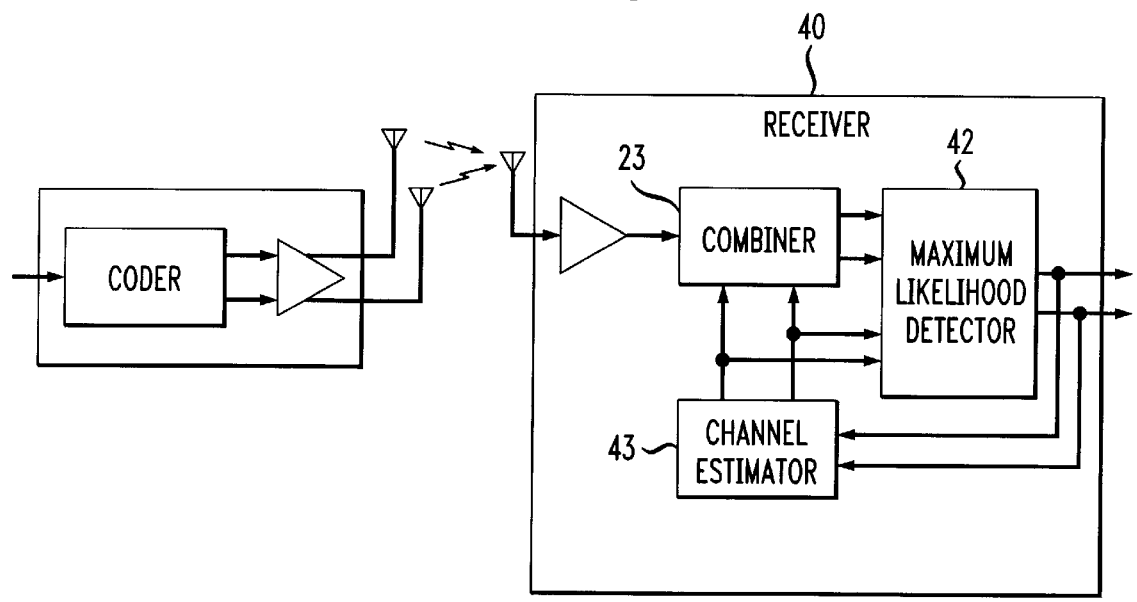
FIG. 3 shows a block diagram of a third embodiment, where channel estimates are derived from recovered signals.

FIG. 3 depicts an embodiment that does not require the constellation of the transmitted signals to comprise symbols of equal power. (Elements in FIG. 3 that are referenced by numbers that are the same as reference numbers in FIG. 1 are like elements.) In FIG. 3, channel estimator 43 of receiver 40 is responsive to the output signals of maximum likelihood detector 42. Having access to the recovered signals $s_0$ and $s_1$, channel estimator 43 forms the estimates $$\tilde{h}_0 = \frac{r_0 s_0^* - r_1 s_1}{|s_0|^2 + |s_1|^2} = h_0 + \frac{s_0^* n_0 + s_1 n_1}{|s_0|^2 + |s_1|^2} \quad (17)$$

$$\tilde{h}_1 = \frac{r_0 s_1^* - r_1 s_0}{|s_0|^2 + |s_1|^2} = h_1 + \frac{s_1^* n_0 + s_0 n_1}{|s_0|^2 + |s_1|^2}$$

and applies those estimates to combiner 23 and to detector 42. Detector 24 recovers signals $s_2$ and $s_3$ by employing the approach used by detector 24 of FIG. 1, except that it does not employ the simplification of equation (9). The recovered signals of detector 42 are fed back to channel estimator 43, which updates the channel estimates in preparation for the next cycle.

Figure 4:
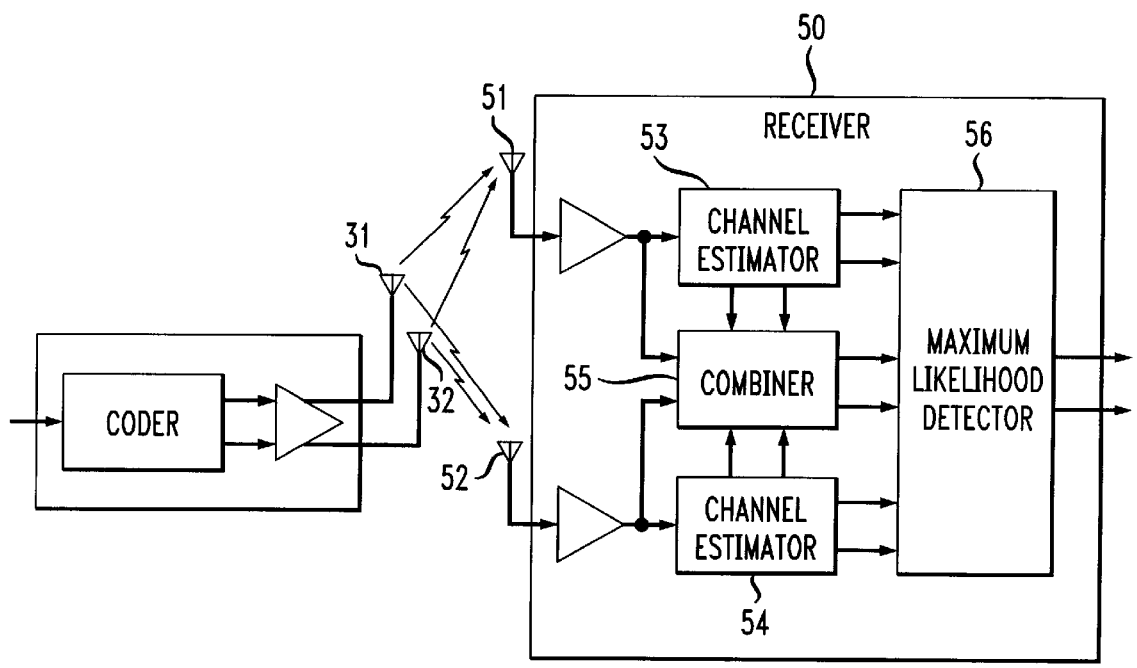
FIG. 4 illustrates an embodiment where two transmitter antennas and two receiver antennas are employed.

The FIGS. 1–3 embodiments illustrate the principles of this invention for arrangements having two transmit antennas and one receive antenna However, those principles are broad enough to encompass a plurality of transmit antennas and a plurality of receive antennas. To illustrate, FIG. 4 presents an embodiment where two transmit antennas and two receive antennas are used; to wit, transmit antennas 31 and 32, and receive antennas 51 and 52. The signal received by antenna 51 is applied to channel estimator 53 and to combiner 55, and the signal received by antenna 52 is applied to channel estimator 54 and to combiner 55. Estimates of the channel transfer functions $h_0$ and $h_1$ are applied by channel estimator 53 to combiner 55 and to maximum likelihood detector 56. Similarly, estimates of the channel transfer functions $h_2$ and $h_3$ are applied by channel estimator 54 to combiner 55 and to maximum likelihood detector 56. Table 2 defines the channels between the transmit antennas and the receive antennas, and table 3 defines the notion for the received signals at the two receive antennas.

TABLE 2

|            | Antenna 51 | Antenna 52 |
|------------|------------|------------|
| Antenna 31 | $h_0$      | $h_2$      |
| Antenna 32 | $h_1$      | $h_3$      |

TABLE 3

|          | Antenna 51 | Antenna 52 |
|----------|------------|------------|
| Time t   | $r_0$      | $r_2$      |
| Time t + T | $r_1$    | $r_3$      |

Based on the above, it can be shown that the received signals are $$r_0 = h_0 s_0 + h_1 s_1 + n_0$$
$$r_1 = -h_0 s_1^* + h_1 s_0^* + n_1$$
$$r_2 = h_2 s_0 + h_3 s_1 + n_2$$
$$r_3 = -h_2 s_1^* + h_3 s_0^* + n_3 \quad (15)$$

where $n_0$, $n_1$, $n_2$, and $n_3$ are complex random variable representing receiver thermal noise, interferences, etc.

In the FIG. 4 arrangement, combiner 55 develops the following two signals that are sent to the maximum likelihood detector:

$$\tilde{s}_0 = h_0^* r_0 + h_1 r_1^* + h_2^* r_2 + h_3 r_3^*$$
$$\tilde{s}_1 = h_1^* r_0 - h_0 r_1^* + h_3^* r_2 - h_2 r_3 I. \quad (16)$$

Substituting the appropriate equations results in $$\tilde{s}_0 = (a_0^2 + a_1^2 + a_2^2 + a_3^2) s_0 + h_0^* n_0 + h_1 n_1^* + h_2^* n_2 + h_3 n_3^*$$
$$\tilde{s}_1 = (a_0^2 + a_1^2 + a_2^2 + a_3^2) s_1 + h_1^* n_0 - h_0 n_1^* + h_3^* n_2 - h_2 n_3^*, \quad (17)$$

which demonstrates that the signal $\tilde{s}_0$ and $\tilde{s}_1$ are indeed estimates of the signals $s_0$ and $s_1$. Accordingly, signals $\tilde{s}_0$ and $\tilde{s}_1$ are sent to maximum likelihood decoder 56, which uses the decision rule of equation (10) to recover the signals $\tilde{s}_0$ and $\tilde{s}_1$.

As disclosed above, the principles of this invention rely on the transmitter to force a diversity in the signals received by a receiver, and that diversity can be effected in a number of ways. The illustrated embodiments rely on space diversity—effected through a multiplicity of transmitter antennas, and time diversity—effected through use of two time intervals for transmitting the encoded symbols. It should be realized that two different transmission frequencies could be used instead of two time intervals. Such an embodiment would double the transmission speed, but it would also increase the hardware in the receiver, because two different frequencies need to be received and processed simultaneously.

The above illustrated embodiments are, obviously, merely illustrative implementations of the principles of the invention, and various modifications and enhancements can be introduced by artisans without departing from the spirit and scope of this invention, which is embodied in the following claims. For example, all of the disclosed embodiments are illustrated for a space-time diversity choice, but as explained above, one could choose the space-frequency pair. Such a choice would have a direct effect on the construction of the receivers.

We claim:

1. An arrangement comprising:
    a coder responsive to incoming symbols, forming a set of channel symbols that incorporate redundancy, where the coder employs replications and, at least for some of the channel symbols, forms a negative of an incoming symbol, forms a complex conjugate of an incoming symbol, or forms a negative complex conjugate of an incoming symbol; and
    an output stage that applies said channel symbols to at least one transmitter antenna to form at least two distinct channels over a transmission medium.

2. The arrangement of claim 1 where said at least two distinct channels direct information to a single receiver antenna.

3. The arrangement of claim 1 where each of said at least two distinct channels transmits a channel symbol for each incoming symbol encoded by said coder.

4. The arrangement of claim 1 where said coder encodes incoming symbols in blocks of n symbols.

5. The arrangement of claim 4 where, when n=2, the coder encodes an incoming block of symbols $s_0$ and $s_1$ into a sequence of symbols $s_0$ and $-s_1^*$, and into a sequence of symbols $s_1$ and $s_0^*$, where $s_i^*$ is the complex conjugate of $s_i$.

6. The arrangement of claim 1 where said output stage comprises a first antenna and a second antenna, and where in response to a sequence $\{s_0, s_1, s_2, s_3, s_4, s_5 \ldots\}$ of incoming symbols said coder develops a sequence $\{s_0, -S_1^*, s_2, -s_3^*, s_4, -s_5^* \ldots\}$ that is applied said first antenna by said output stage, and a sequence $\{s_1, s_0^*, s_3, s_2^*, s_5, s_4^* \ldots\}$ that is applied to said second antenna by said output stage, where $s_i^*$ is the complex conjugate of $s_i$.

7. The arrangement of claim 4 where said coder develops n•m channel symbols for each block of n incoming symbols, where m is the number of said distinct channels.

8. The arrangement of claim 7 where said n•m channel symbols are distributed to said m distinct channels.

9. The arrangement of claim 8 where said transmitter employs K transmitter antennas to effect K distinct channels, and where said n•m channel symbols are distributed to said K antennas over L time intervals, where K=m and L=n, or K=n and L=m.

10. The arrangement of claim 8 where said transmitter employs K transmitter antennas to effect K distinct channels, and where said n•m channel symbols are distributed to said K antennas over L frequencies, where K=m and L=n, or K=n and L=m.

11. The arrangement of claim 1 further comprising a receiver having a single antenna that is adapted to receive and decode signals transmitted by said output stage.

12. The arrangement of claim 1 further comprising a receiver having two receive antennas that is adapted to receive and decode signals transmitted by said output stage.

13. A transmitter comprising:
    first means, responsive to incoming symbols, for forming a set of channel symbols with redundancy in said set of channel symbols, where at least in forming some of the channel symbols the coder replicates other channel symbols, replicates and negates said other channel symbols, or replicates and negates a part of said other channel symbols, and second means, for transmitting to a transmission medium channel symbols formed by said first means over at least two antennas.

14. A transmitter comprising:

first means for transmitting channel symbols over two different and distinct transmitter channel types, thereby providing transmitter-created diversity, where one of the channel types is space diversity, and the other of the transmitter channel types is taken from a set including frequency diversity and time diversity;

a coder for encoding incoming symbols in blocks of n symbols to form n•m channel symbols; and third means for distributing m groups of n channel symbols each to said first means.

15. The transmitter of claim 14 where each one of said groups is applied to a first of said distinct transmitter channels.

16. The transmitter of claim 14 where one of said distinct transmitter channels is effected with a plurality of transmitter antennas, providing space diversity, and another of said distinct transmitter channels is effected with a plurality of time intervals.

17. The transmitter of claim 16 where the number of said transmitter antennas is m and said m groups of channel symbols are distributed to said m transmitter antennas.

18. The transmitter of claim 17 where n=2.

19. A method for transmitting over a transmission medium information corresponding to incoming symbols, comprising the steps of:

encoding incoming symbols in block of n symbols, to form n•m channel symbols, where m is a number of distinct space diverse channels over which said method transmits symbols over said transmission medium, where said encoding involves replication of incoming symbols and, for at least some of said channel symbols, involve replication and negation; and distributing said n•m channel symbols over said m channels so that each incoming symbol has a corresponding channel symbol in each of said m channels.

20. The method of claim 19 where said encoding involves forming a complex conjugate of incoming symbols.

21. The method of claim 19 where said encoding consists of replicating an incoming symbol, forming a complex conjugate of an incoming symbol, forming a negative of an incoming symbols, or forming a negative complex conjugate of an incoming symbol.

22. A method for transmitting information corresponding to incoming symbols, comprising the steps of:

encoding incoming symbols in block of n symbols, to form n•m channel symbols, where m is a number of distinct space diverse channels over which said method transmits symbols over said transmission medium; and distributing said n•m channel symbols over said m channels so that each incoming symbol had a corresponding channel symbol in each of said m channels;

where said encoding involves replication of incoming symbols and, for at least some of said channel symbols, involves replication and negation operation.

23. A receiver comprising:

a combiner responsive to signals received by an antenna and to channel estimates developed for at least two concurrent space diverse paths over which said signals arrive at said antenna, for developing sets of information symbol estimates, where said combiner develops said sets of information symbol estimates by combining said signals received by said antenna with said channel estimates via operations that involve multiplications, negations, and conjugations;

a detector responsive to said sets of information symbol estimates that develops maximum likelihood decisions regarding information symbols encoded into channel symbols and embedded in said signals received by said antenna; and a channel estimator responsive to said signals received by said antenna for developing said channel estimates;

where said signal received by said antenna at a given time interval corresponds to $$r(t)=h_0 s_i + h_1 s_j + n(t),$$

and in a next time interval corresponds to $$r(t+T) = -h_0 s_j^* + h_1 s_i^* + n(t+T),$$

where $h_0$ is a transfer function of a channel over which a symbol $s_i$ is transmitted at said given time, $h_1$ is a transfer function of a channel over which a symbol $s_j$ is transmitted at said given time interval, n(t) and n(t+T) are noise signals at said given time interval and said next time interval, respectively, and * appended to a signal designation represents the complex conjugate of the signal; and where said combiner forms a set of information symbol estimates comprising symbols $\tilde{s}_i$ and $\tilde{s}_j$ by forming signals $$\tilde{s}_i = \tilde{h}_0^* r(t) + \tilde{h}_1 r^*(t+T)$$

and $$\tilde{s}_j = \tilde{h}_1^* r(t) - \tilde{h}_0 r^*(t+T)$$

where $\tilde{h}_i$ is the estimate of the channel transfer function $h_i$.

24. The receiver of claim 23 where said detector settles on symbol $\tilde{s}_i = s_x$ iff $d^2(\tilde{s}_1, s_x) \leq d^2(\tilde{s}_1, s_k)$, where $d^2(\tilde{s}_1, s_x)$ corresponds to $(\tilde{s}_i - s_x)(s_i^* - s_x^*)$.

25. The receiver of claim 23 further comprising a channel estimator, responsive to said sets of information symbols developed by said combiner, for developing said channel estimates.

26. The receiver of claim 23 further comprising a channel estimator, responsive to output signals of said detector, for developing said channel estimates.

27. The receiver of claim 26 where said channel estimator develops channel estimates $\tilde{h}_0$ and $\tilde{h}_1$ by evaluating the expressions $$\tilde{h}_0 = \frac{r_0 s_0^* - r_1 s_1}{|s_0|^2 + |s_1|^2}$$

$$\tilde{h}_1 = \frac{r_0 s_1^* - r_1 s_0}{|s_0|^2 + |s_1|^2}$$

where symbols $s_0$ and $s_i$ are output symbols of said detector, $r_0$ is a signal received at said antenna at a given time interval, $r_1$ is a signal received at said antenna at a next time interval, $s_i^*$ is the complex conjugate of $s_i$, and $|s_i|^2$ is the magnitude, squared, of symbol $s_i$.

28. A receiver comprising:

a combiner responsive to signals received by an antenna from space-diverse paths and to detected information symbols, for developing sets of information symbol estimates, where said combiner develops said sets of information symbol estimates by combining said signals received by said antenna with said detected information symbols with operations that involve multiplications, negations, and conjugations; and a detector responsive to said sets of information symbol estimates that employs maximum likelihood decisions regarding information symbols encoded into channel symbols and embedded in said signals received by said antenna, to develop thereby said detected information symbols;

where said signal received by said antenna at a given time interval corresponds to $$r(t) = r_0 = h_0 s_0 + h_1 s_1 + n_0,$$

and at subsequent time intervals corresponds to $$r(t+T) = r_1 = -h_0 s_1^* + h_1 s_0^* + n_1$$

$$r(t+2T) = r_2 = h_0 s_2 + h_1 s_3 + n_2,$$

and $$r(t+3T) = r_3 = -h_0 s_3^* + h_1 s_2^* + n_3,$$

where $h_0$ is a transfer function of a channel over which a symbol $s_0$ is transmitted at said given time interval, $h_1$ is a transfer function of a channel over which a symbol $s_1$ is transmitted at said given time interval, the n terms are noise signals, and * appended to a signal designation represents the complex conjugate of the signal; and where said combiner forms a set of information symbol estimates comprising symbols $\tilde{s}_2$ and $\tilde{s}_3$ by forming the signals $$\tilde{s}_2 = As_1^* + Bs_0$$

$$\tilde{s}_3 = -As_0 + Bs_1,$$

where $$A = r_0 r_3^* - r_2 r_1^*.$$

29. The receiver of claim 23 where said combiner develops a set of n information symbols from n•m received channel symbols, where m is the number of concurrent paths for which said channel estimator develops channel estimates.

30. An arrangement comprising:

a coder responsive to incoming symbols, forming a set of channel symbols that incorporate redundancy, where the coder creates some channel symbols by replicating other channel symbols or by replicating and negating other channel symbols or parts thereof; and an output stage that applies said channel symbols to at least one transmitter antenna to form at least two distinct channels over a transmission medium.

* * * * *

UNITED STATES PATENT AND TRADEMARK OFFICE
CERTIFICATE OF CORRECTION

PATENT NO. : 6,185,258B1  
DATED : February 6, 2001  
INVENTOR(S) : Alamouti et al.

Page 1 of 1

It is certified that error appears in the above-identified patent and that said Letters Patent is hereby corrected as shown below:

Column 3,  
Line "lock" should be -- block --;  
Line 59, should be -- $r(t) = \alpha_0 e^{j\Theta 0} s_i + \alpha_1 e^{j\Theta 1} s_j + n(t)$ --;

Column 5,  
Line 61, should be -- $\hat{s}_i = s_x$ iff $d^2(\tilde{s}_i, s_x) \leq d^2(\tilde{s}_i, s_k)$ Line 61, should be -- $\tilde{s}_2 = A s_1^* + B s_0$ --;

Line 65, "$r_2 = h_0\hat{s}_2 + h_1\hat{s}3 = h_0s_2 + h_1s_3 + n_2$" should be -- $r_2 = h_0\hat{s}_2 + h_1\hat{s}_3 = h_0s_2 + h_1s_3 + n_2$ --;

Column 7,  
Line 39, should be -- $\tilde{s}_1 = h_1^* r_0 - h_0 r_1^* + h_3^* r_2 - h_2 r_3^*$ --;

Column 8,  
Line 36, "$S_1$" should be -- $s_1$ --;

Signed and Sealed this

Eleventh Day of February, 2003

JAMES E. ROGAN  
*Director of the United States Patent and Trademark Office*

UNITED STATES PATENT AND TRADEMARK OFFICE
CERTIFICATE OF CORRECTION

PATENT NO.    : 6,185,258 B1
DATED         : February 6, 2001
INVENTOR(S)   : Alamouti et al.

It is certified that error appears in the above-identified patent and that said Letters Patent is hereby corrected as shown below:

<u>Column 3,</u>
Line 1, "lock" should be -- block --;
Line 59, should be -- $r(t) = \alpha_0 e^{j\Theta_0} s_i + \alpha_1 e^{j\Theta_1} s_j + n(t)$ --;

<u>Column 5,</u>
Line 23, should be -- $\hat{s}_i = s_x$ iff $d^2(\tilde{s}_i, s_x) \leq d^2(\tilde{s}_i, s_k)$ Line 61, should be -- $\tilde{s}_2 = A s_1{}^* + B s_0$ --;

Line 65, "$r_2 = h_0 \hat{s}_2 + h_1 \hat{s}3 = h_0 s_2 + h_1 s_3 + n_2$" should be -- $r_2 = h_0 \hat{s}_2 + h_1 \hat{s}_3 = h_0 s_2 + h_1 s_3 + n_2$ --;

<u>Column 7,</u>
Line 39, should be -- $\tilde{s}_1 = h_1{}^* r_0 - h_0 r_1{}^* + h_3{}^* r_2 - h_2 r_3{}^*$ --;

<u>Column 8,</u>
Line 36, "S$_1$" should be -- s$_1$ --;

This certificate supersedes Certificate of Correction issued February 11, 2003.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,185,258 B1 Page 1 of 1
APPLICATION NO. : 09/074224
DATED : August 10, 2004
INVENTOR(S) : Siavash Alamouti et al.

It is certified that error appears in the above-identified patent and that said Letters Patent is hereby corrected as shown below:

At column 2, lines 30-31, delete "(based on a provision application filed Nov. 7, 1996)" and insert therefor -- , now U.S. Pat. No. 6,115,427, issued on Sept. 5, 2000, --.

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

PATENT NO.         : 6,185,258 B1                                              Page 1 of 1
APPLICATION NO.   : 09/074224
DATED              : February 6, 2001
INVENTOR(S)        : Siavash Alamouti et al.

It is certified that error appears in the above-identified patent and that said Letters Patent is hereby corrected as shown below:

At column 2, lines 30-31, delete "(based on a provision application filed Nov. 7, 1996)" and insert therefor -- , now U.S. Pat. No. 6,115,427, issued on Sept. 5, 2000, --.

This certificate supersedes Certificate of Correction issued June 5, 2007.

Signed and Sealed this

Tenth Day of July, 2007

JON W. DUDAS
*Director of the United States Patent and Trademark Office*